(12) United States Patent
Duckeck et al.

(10) Patent No.: US 6,435,054 B1
(45) Date of Patent: Aug. 20, 2002

(54) SHIFTING DEVICE FOR A MANUAL GEAR TRANSMISSION

(75) Inventors: Friedrich Duckeck, Reutlingen; Günter Wörner, Kernen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/601,179

(22) PCT Filed: Dec. 17, 1998

(86) PCT No.: PCT/EP98/08289

§ 371 (c)(1),
(2), (4) Date: Sep. 19, 2000

(87) PCT Pub. No.: WO99/39117

PCT Pub. Date: Aug. 5, 1999

(30) Foreign Application Priority Data

Jan. 30, 1998 (DE) .......................................... 198 03 593

(51) Int. Cl.[7] .............................................. B60K 20/00
(52) U.S. Cl. ................................. 74/473.34; 74/473.29; 74/473.15; 74/473.36
(58) Field of Search ........................ 74/473.15, 473.24, 74/473.34, 473.35, 473.36

(56) References Cited

U.S. PATENT DOCUMENTS

| | | | | |
|---|---|---|---|---|
| 4,364,450 A | * | 12/1982 | Kemp et al. ................. | 180/336 |
| 5,144,853 A | * | 9/1992 | Giudici ...................... | 74/473 R |
| 5,321,993 A | * | 6/1994 | Herzog et al. ............. | 74/473 R |
| 5,845,536 A | * | 12/1998 | Certeza ................... | 74/473.26 |
| 5,921,141 A | * | 7/1999 | Gouselis ................. | 74/473.33 |

FOREIGN PATENT DOCUMENTS

| | | |
|---|---|---|
| DE | 14 98 498 | 11/1940 |
| DE | 93 08 072 | 9/1993 |
| EP | 0 448 526 | 9/1991 |
| EP | 0 699 853 | 3/1996 |
| FR | 2 214 921 | 8/1974 |

* cited by examiner

*Primary Examiner*—David A. Bucci
*Assistant Examiner*—Timothy McAnulty
(74) *Attorney, Agent, or Firm*—Crowell & Moring LLP

(57) ABSTRACT

A selector device for a change-speed gearbox. The selector device includes a remote selector rod for selecting the gears, a flexible-actuating linkage for changing over between the gears, and a coupling linkage for accepting reaction forces which are provided between the change-speed gearbox and a manual selector lever and its bearing arrangement.

30 Claims, 5 Drawing Sheets

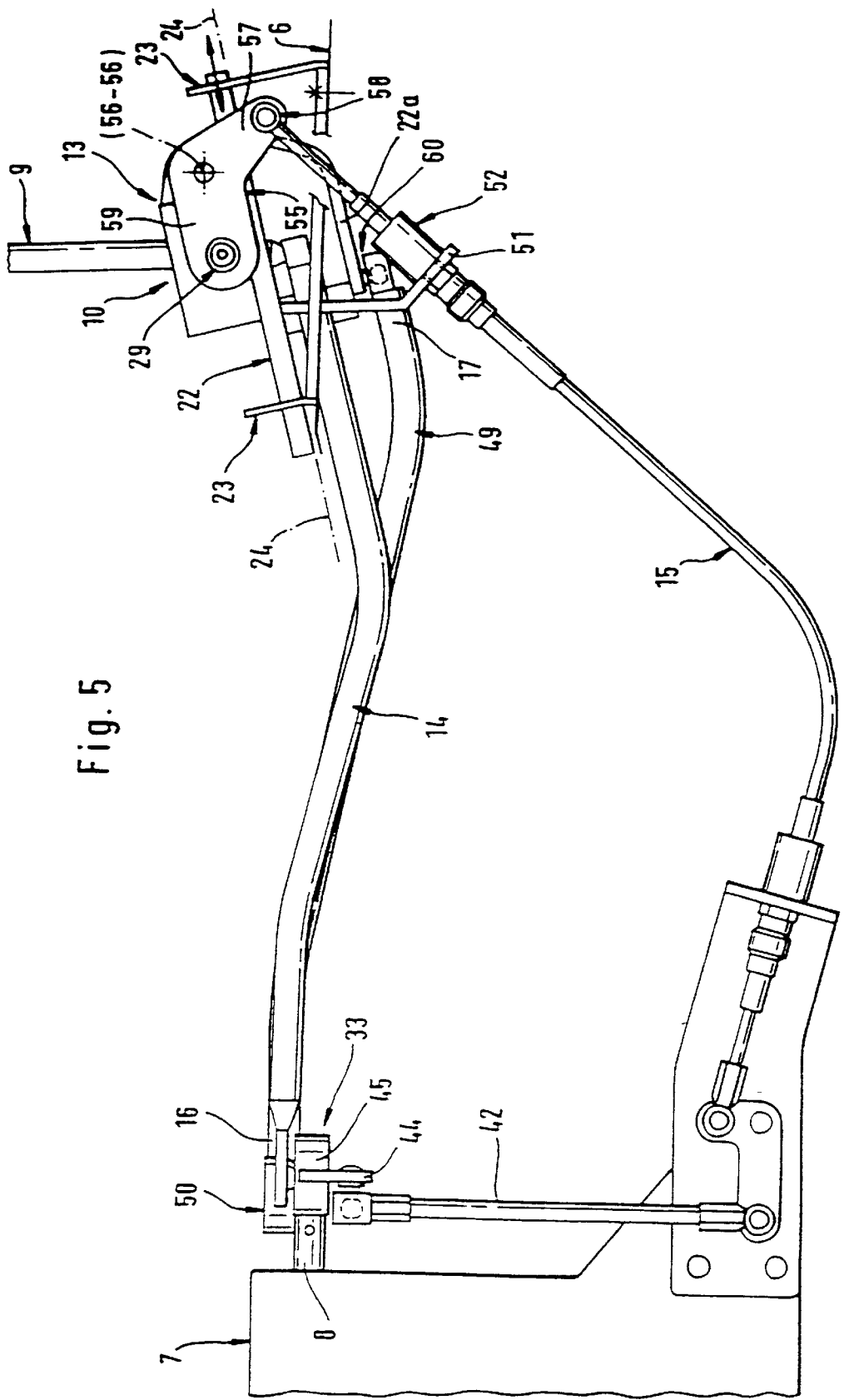

SHIFTING DEVICE FOR A MANUAL GEAR TRANSMISSION

BACKGROUND AND SUMMARY OF THE INVENTION

The invention relates to a selector device preamble of Claim 1.

In a known selector device of the type disclosed in German Patent Document DE 14 98 498 U1, the manual selector lever is mounted pivotably in a radial bearing bracket at the upper end of a selector tube mounted rotatably on the steering column of a motor vehicle and is coupled by its end projecting into the selector tube to a flexible actuating linkage which is routed through the selector tube and leads to a changeover plate which is arranged in the change-speed gearbox and is guided in such a way that it can be displaced parallel to the selector shaft between two changeover end positions. Each of these two changeover end positions is assigned a selector gate having two speeds in the selector pattern of the manual selector lever, the changeover plate being actuated by pivoting the manual selector lever into its respective changeover end position about a pivoting axis of the bearing bracket, said pivoting axis being perpendicular to the axis of rotation of the selector tube. In this known selector device, the lower end of the selector tube is connected kinematically to a multi-part remote selector linkage which leads to the change-speed gearbox and is there connected kinematically to the rotatably mounted selector shaft, which actuates a gear clutch for the engagement or disengagement of one of the speeds associated with the selected selector gate directly or indirectly by means of a selector cam fixed to the said shaft in terms of motion when the manual selector lever is pivoted about the axis of rotation of the selector tube and thereby causes the selector tube and inevitably with the latter also the selector shaft to rotate. In this known selector device, the split into a selector shaft and a changeover plate at the gearbox-side input of the selector device means that a precise gear change is not always guaranteed, and this split can also lead to difficulties as regards to the suppression of vibrations excited by the engine. Moreover, relative movements in the longitudinal direction of the vehicle of the engine/gearbox unit, which is situated at the front in the longitudinal direction of the vehicle, and the vehicle body, on which the manual selector lever arranged behind the gearbox is held, are transmitted unfiltered to the manual selector lever, and this can lead to vibrational movements during the starting of the engine.

German Patent Document DE 93 08 072.2 U1 has disclosed a selector-lever housing of a different generic type for mechanical motor-vehicle gearboxes, in which a fastening device intended for attachment to body components, an actuating rod used to transmit gear-change movements, a supporting rod and a manual selector lever operatively connected to the actuating rod are provided. In order to design a selector-lever housing of this kind, the mounting of which on the body or other parts of the vehicle frame is configured with a view to simple damping or decoupling of vibrational movements of an associated gearbox, a housing body to which the supporting rod is attached, in which the actuating rod is mounted in such a way that it can be displaced in the direction of its axis and can be pivoted about its axis, and on which the manual selector lever is mounted, is to be provided in the case of this known selector-lever housing, the fastening device being formed by a mounting plate connected to the housing body, with at least one spring element arranged in between.

European Patent Document EP 0 448 526 A1 has disclosed another remote selector device of a different generic type for connecting a manual selector lever to a change-speed gearbox of a motor vehicle, in which a first actuator for choosing the gears and a second actuator for selecting the gears are each arranged within the gearbox, and, to avoid the transmission of vibrations and noise entailed by the use of a remote selector linkage that transmits both the changeover and the selection movements, the changeover actuator is coupled to the manual selector lever by an intrinsically rigid selector linkage, and the selector actuator is coupled to the manual selector lever by a flexible selector linkage.

Finally, European Patent Document EP 0 699 853 A1 has disclosed an actuating device of a different generic type for controlling gear changing in a gearbox of a motor vehicle, which actuating device is spatially separated from the gearbox and in which the selection and changeover movements are transmitted to the gearbox by two selector rods or two selector cables, and in which a selector lever for choosing the selector gates and selecting the gears, a device for returning the selector lever to a particular neutral position and at least one resistance device for influencing the actuating force involved in choosing the selector gates are provided. In this known actuating device, a locking device to secure the positions of the selector lever in selector gates is used to ensure that the driver receives haptic confirmation of the completion of the gear change when selecting the gears in the selector gates.

The object of the invention is to essentially prevent as far as possible the occurrence of vibration, i.e. low-frequency movements and structure-borne noise, in a selector device of the type stated at the outset while making the selection sequence more precise.

In the selector device according to the invention, three connecting elements are used between the change-speed gearbox and the mounting of the manual selector lever, namely a remote selector rod between the selector shaft and the manual selector lever as a first connecting element, a flexible changeover actuating linkage between the selector shaft and the manual selector lever as a second connecting element, and a coupling linkage between the mounting of the manual selector lever and the gearbox casing of the change-speed gearbox as a third connecting element, with the result that both low-frequency engine vibration is decoupled and the transmission of high-frequency vibration to the mounting of the manual selector lever is prevented. In the selector device according to the invention, the engine vibration which occurs when the engine is started is not converted into selection or changeover movements of the manual selector lever because the latter is mounted on the coupling rod, which is connected to the engine and can be supported with the ability for limited movement in the longitudinal direction of the vehicle relative to the vehicle body. In the selector device according to the invention, spherical joints can advantageously be used for the connections of the remote selector rod and the coupling linkage to the change-speed gearbox or gearbox casing because the changeover action is transmitted to the change-speed gearbox by the additional connecting element, the changeover actuating linkage, which is connected to the central selector shaft. In the selector device according to the invention, the coupling linkage can be supported relative to the fixed body component in such a way that reaction forces occurring in the transverse direction of the vehicle cannot affect the manual selector lever.

Configurations of this selector device according to the invention which have been explained above, and further advantageous configurations of the said device, form the subject-matter of the subclaims.

BRIEF DESCRIPTION OF THE DRAWINGS

The invention is described in greater detail below with reference to three embodiments illustrated schematically in the drawing, in which:

FIG. 5 shows a selector device according to the invention in a third embodiment, in a side view.

DETAILED DESCRIPTION OF THE DRAWINGS

Figure 1:
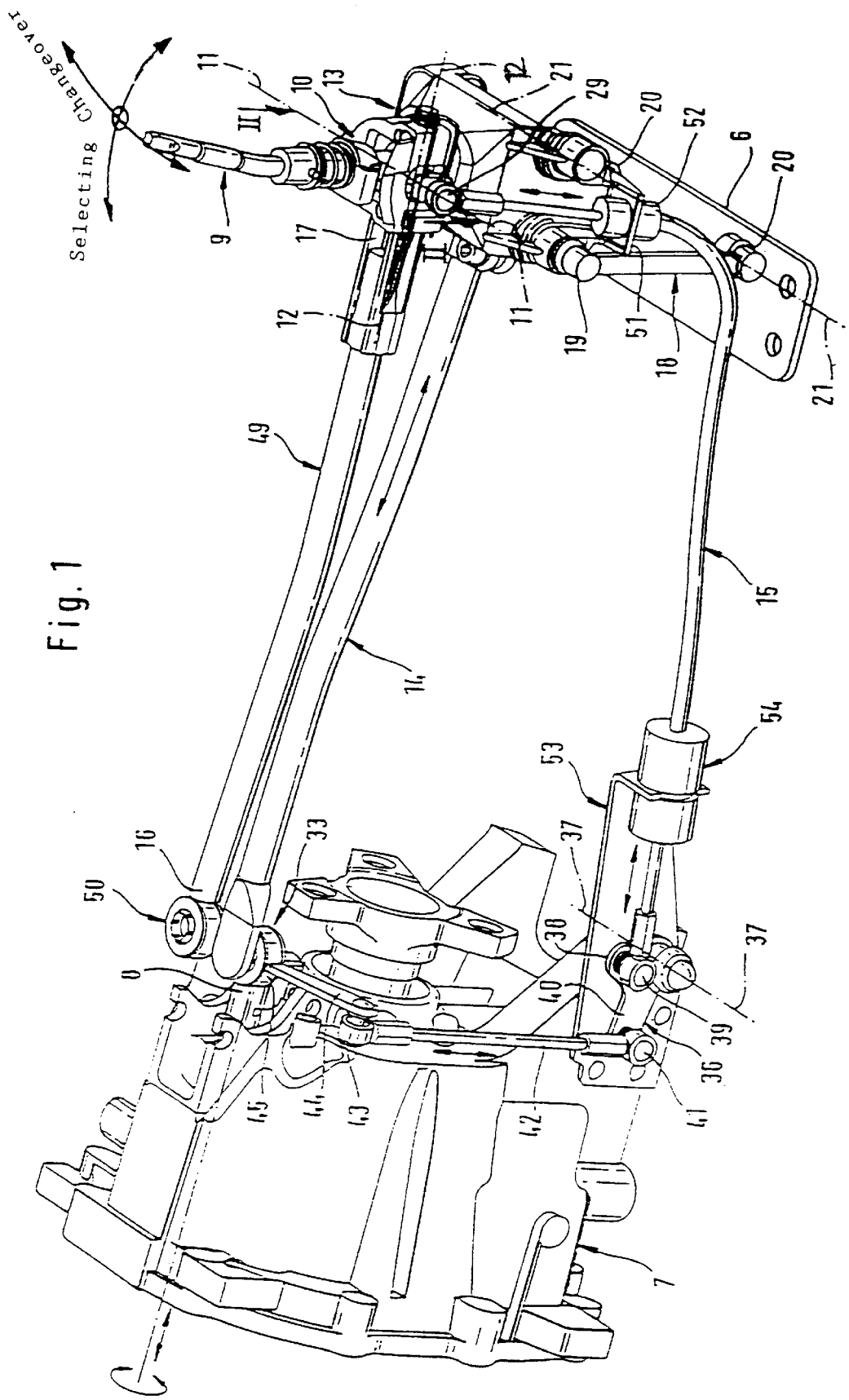
FIG. 1 shows a selector device according to the invention in the first embodiment in perspective representation.
Figure 2:
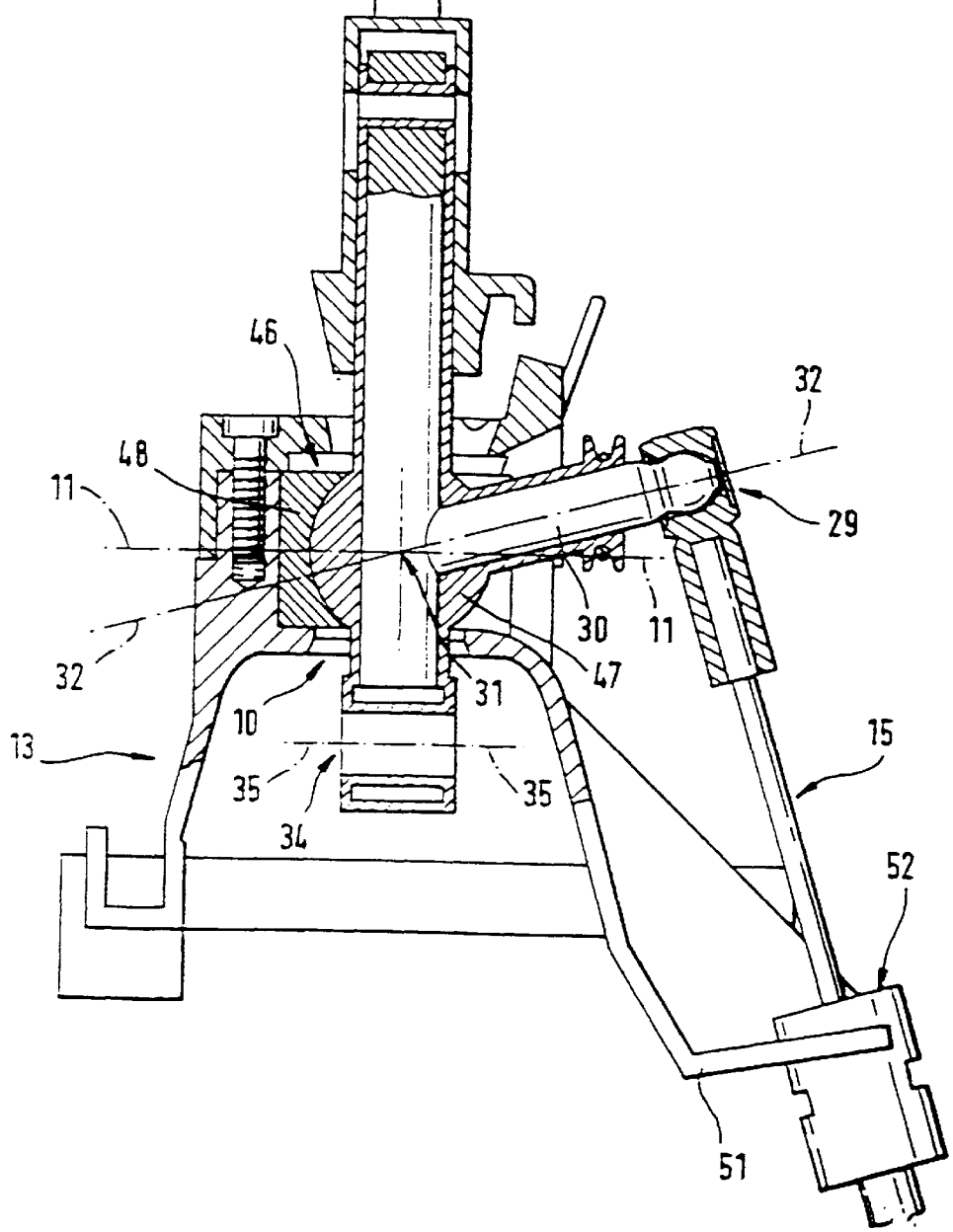
FIG. 2 shows a partial section through the selector device of FIG. 1 along the line II—II.
Figure 3:
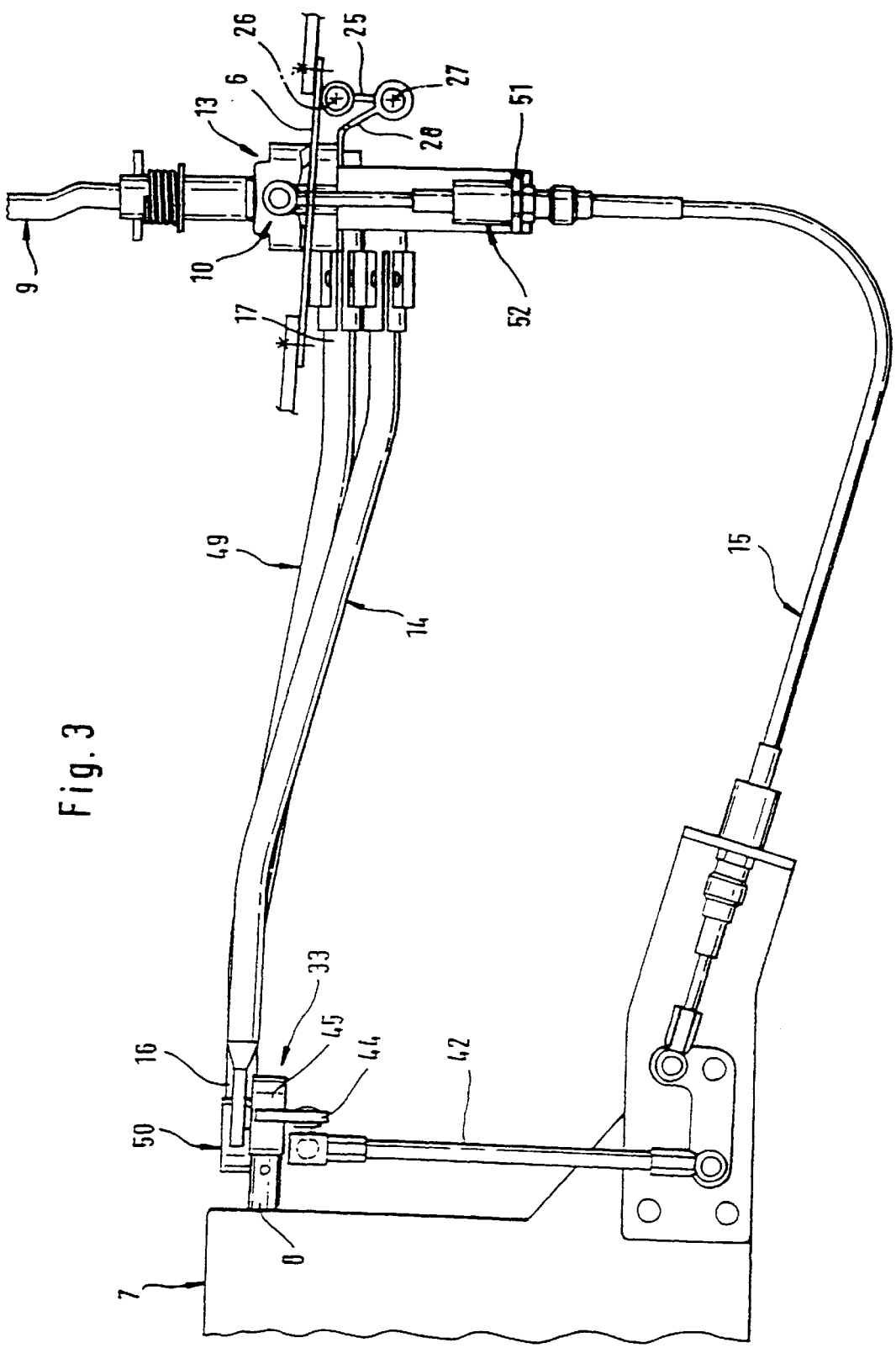
FIG. 3 shows a selector device according to the invention in a second embodiment, in a side view.
Figure 4:
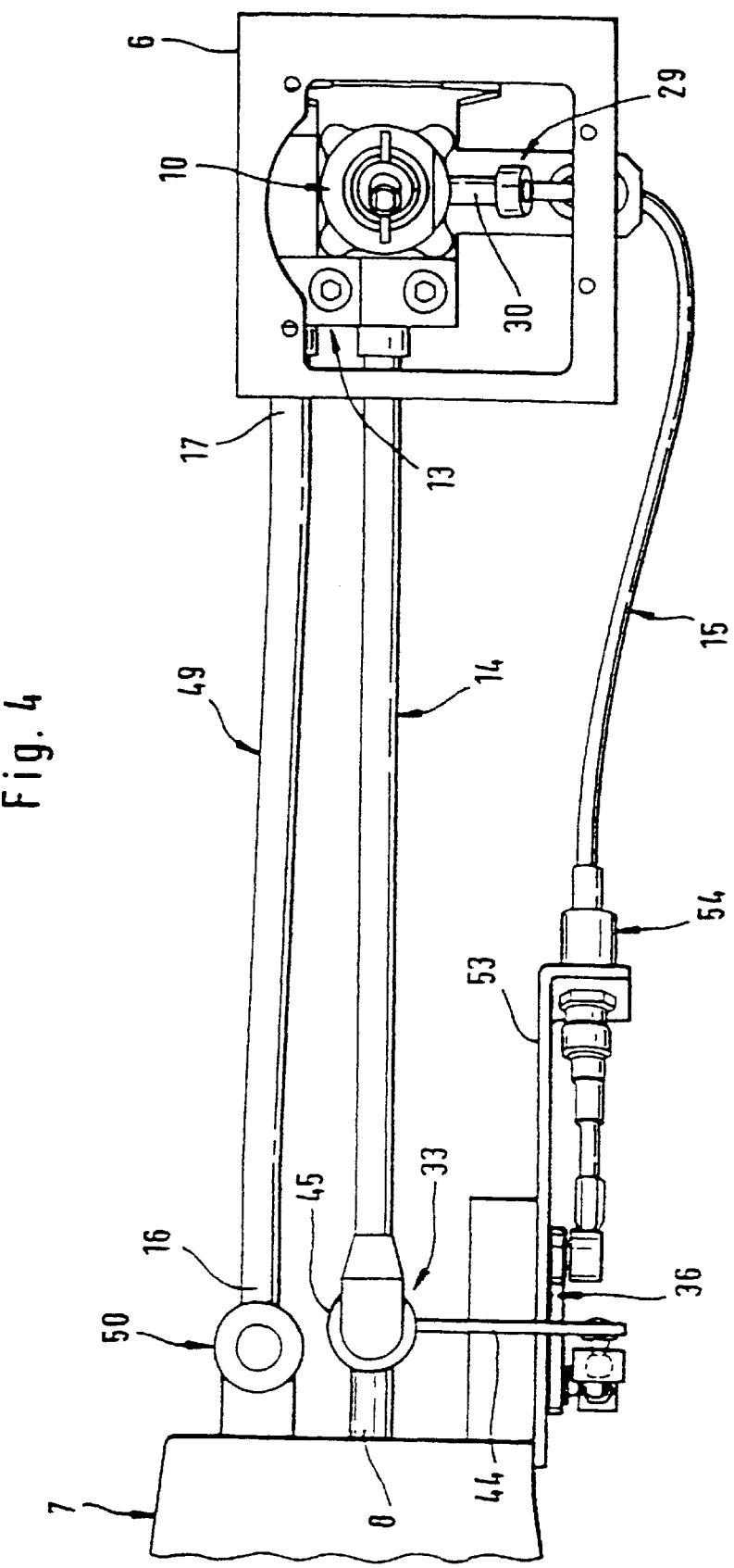
FIG. 4 shows the selector device of FIG. 3 in a plan view.

The following features—for which the same reference numerals are used in each case—coincide in the three embodiments of the selector device according to the invention:

Both a gearbox casing 7 of a change-speed gearbox and a bearing arrangement 10 for the pivotable mounting of a manual selector lever 9 are each supported with limited elasticity and limited movement relative to a fixed body component 6 of a vehicle body (not shown specifically) of a motor vehicle. An essential component of the bearing arrangement 10 is a ball-and-socket-joint 46, the joint ball 47 of which is arranged fixed in terms of motion relative to the manual selector lever 9 and the ball socket 48 of which, which holds the joint ball 47 in a manner which allows it to slide and perform a rotary motion, is arranged fixed in terms of motion relative to a holding device 13. The ball-and-socket joint 46 and a slotted guide (not shown) allow the manual selector lever to pivot about two mutually perpendicular pivoting axes 11—11 and 12—12 for the selection and changeover movements of the manual selector lever 9. The ball-and-socket joint 46 divides the manual selector lever 9 into an upper lever portion, which has the selector knob, and a lower lever portion, which is connected to a remote selector rod 14 by a uniaxial joint 34—the joint axis 35—35 of which is aligned parallel to the pivoting axis 11—11 for the selection movements of the manual selector lever 9. The remote selector rod 14 leads to a selector shaft 8, which is mounted rotatably and in an axially displaceable manner in the gearbox casing 7 and has an end which passes out through the casing and to which the remote selector rod 14 is connected by a spherical joint 33. The holding device 13 is connected to the rear end 17 of a coupling linkage 49, the front end 16 of which is connected to the gearbox casing 7 by a spherical joint 50. A lever arm 30, which is fixed in terms of motion relative to the manual selector lever 9, and a lever arm 44 which is fixed in terms of motion relative to the selector shaft 8, are coupled kinematically to one another by a flexible changeover actuating linkage 15. Ideally, the center axis 32—32 of the lever arm 30 which runs through the center 31 of the ball-and-socket joint 46—coincides with the pivoting axis 11—11 of the manual selector lever 9; in the embodiments shown in the drawing, a slight angle of obliquity has arisen between these two axes owing to installation conditions, but this has no effect on the selector shaft 8 due to the flexibility of the changeover actuating linkage 15. At its end associated with the manual selector lever 9, the changeover actuating linkage 15 is guided in a guide bush 52, which is secured on the holding device 13 by a holder 51. At its end associated with the selector shaft 8, the changeover actuating linkage 15 is guided in a guide bush 54, which is secured on the gearbox casing 7 by a holder 53. Also arranged on the holder 53 of the gearbox casing 7 is a two-armed bell crank lever 36 which can be pivoted about a pivoting axis 37—37 transverse to the longitudinal direction of the vehicle and on one lever arm 38 of which that end of the changeover actuating linkage 15 which is associated with the selector shaft 8 is pivotally mounted by means of a spherical joint 39. The other lever arm 40 of the bell crank lever 36 is connected by a spherical joint 41 to a link rod 42, which for its part is connected by a spherical joint 43 to the lever arm 44, both the latter and the selector shaft 8 being arranged fixed in terms of motion relative to the ball socket 45 of the joint 33. In the two embodiments in FIGS. 1 and 3, that end of the changeover actuating linkage 15 which is associated with a manual selector lever 9 is connected directly to the lever arm 30 by a spherical joint 29. In the third embodiment in FIG. 5, a two-armed bell crank lever 55, one lever arm 57 of which is connected by a spherical joint 58 to that end of the changeover actuating linkage 15 which is associated with the manual selector lever 9, is arranged on the holding device 13 in such a way as to be pivotable about a pivoting axis 56—56 parallel to the pivoting axis 11—11 of the manual selector lever 9. The other lever arm 59 of the bell crank lever 55 is connected to the manual selector lever 9 by the spherical joint 29 of the lever arm 30.

In the first embodiment in FIG. 1, the holding device 13 is connected to the rear linkage end 17 of the coupling rod 49 by two pendulum supports 18—which are located approximately symmetrically with respect to a vertical plane of the holding device 13, said plane containing the pivoting axis 12—12 of the manual selector lever 9—so as to be pivotable to a limited extent relative to the vehicle body about a pivoting axis 21—21 of the fixed body component 6, the said pivoting axis being parallel to the pivoting axis 11—11 of the manual selector lever 9. The pendulum supports 18 are connected respectively to the holding device 13, by a joint 19, and to the body component 6, by a joint 20. By virtue of this arrangement, the coupling linkage 49 is of essentially rigid construction relative to the vehicle body in the transverse direction of the vehicle. Furthermore, by virtue of this arrangement the installation space behind the bearing arrangement 10 of the manual selector lever 9 is not restricted by the selector device. A further advantage of this arrangement is that a spherical joint 50 can be used for the joint to connect the coupling linkage 49 to the gearbox casing 7. In the second embodiment in FIG. 3, the holding device 13 with the rear linkage end 17 of the coupling rod 49 is provided with a rearward-pointing rigid extension 28 which is suspended by means of an oscillating link 25 in such a way that it can oscillate to a limited extent relative to the fixed vehicle component 6 about a pivoting axis 26—26 transverse to the longitudinal direction of the vehicle. The oscillating link 25 is designed as a hinge and is connected pivotably to the extension 28 in such a way as to be pivotable about a hinge axis 27 parallel to the pivoting axis 26—26. In the embodiment in FIG. 5, the holding device 13 is provided with a slide 22, which is guided in a manner which allows limited displacement in a slide guide 23 arranged in a manner fixed in terms of motion relative to the body component 6 fixed to the vehicle. The slide guide 23 is arranged in a guide plane 24—24 of the body component 6 which slopes forwards in the longitudinal direction of the vehicle and is aligned approximately parallel to the pivoting axis 11—11 of the manual selector lever 9.

By virtue of the respective configuration of their support, the coupling rod 49 and hence also the bearing arrangement 10 with the manual selector lever 9 in all three embodiments can perform limited compensating movements relative to the body component 6 in the longitudinal direction of the vehicle, thus preventing relative movements of the engine and the vehicle body from having an effect on the manual selector lever in the form of unwanted engagement and disengagement movements.

What is claimed is:

1. Selector device for a change-speed gearbox comprising:
    a fixed body component of a vehicle body connected with a gearbox casing of the change-speed gearbox, the change-speed gearbox including:
        a selector shaft with a first degree of freedom relative to the gearbox casing for the actuation of gear clutches a second degree of freedom relative to the gearbox casing for the selection of a gear clutch for its actuation by the selector shaft, and
        an elastic support relative to the body component;
    a manual selector lever having a bearing arrangement for pivotability about two mutually perpendicular pivoting axes, the bearing arrangement having a holding device for holding the bearing arrangement relative to the fixed body component;
    a remote selector linkage which connects the manual selector lever kinematically to the selector shaft in such a way that the pivoting movements about the first pivoting axis inevitably lead to movements of the selector shaft in accordance with one of its degrees of freedom for the actuation of gear clutches;
    a flexible actuating linkage for transmitting pulling and pushing forces, which connects the manual selector lever kinematically to the manual selector lever in such a way that the pivoting movements about the second pivoting axis inevitably lead to movements of the manual selector lever in accordance with another of its degrees of freedom for the selection of a gear clutch;
    wherein the holding device includes a coupling linkage which, at its first end at the front in the longitudinal direction of the vehicle, is coupled to the gearbox casing and, at its second end, the end at the rear in the longitudinal direction of the vehicle, is coupled to the fixed body component in a manner which allows limited movement in the longitudinal direction of the vehicle, in that the bearing arrangement is provided at the second end of the coupling linkage; and
    wherein the second end of the coupling linkage can travel along a guided path in the generally longitudinal direction of the vehicle relative to the fixed body component.

2. Selector device according to Patent claim 1, wherein the flexible actuating linkage is connected to a fixed lever arm of the manual selector lever by a ball-and-socket joint.

3. Selector device according to Patent claim 2,
    wherein the bearing arrangement of the manual selector lever is designed as a ball-and-socket joint and the center line of the lever arm of a manual selector lever runs through the center of the ball-and-socket joint.

4. Selector device according to Patent claim 1, wherein the remote selector linkage is designed as a remote selector rod which connects the selector shaft directly to the manual selector lever.

5. Selector device according to Patent claim 4, wherein the selector shaft is connected to the remote selector rod by a ball-and-socket joint.

6. Selector device according to Patent claim 4, wherein the remote selector rod is connected to the manual selector lever by a uniaxial joint, the axis of which is transverse to the longitudinal direction of the vehicle.

7. Selector device for a change-speed gearbox comprising:
    a fixed body component of a vehicle body connected with a gearbox casing of the change-speed gearbox, the change-speed gearbox including:
        a selector shaft with a first degree of freedom relative to the gearbox casing for the actuation of gear clutches a second degree of freedom relative to the gearbox casing for the selection of a gear clutch for its actuation by the selector shaft, and
        an elastic support relative to the body component;
    a manual selector lever having a bearing arrangement for pivotability about two mutually perpendicular pivoting axes, the bearing arrangement having a holding device for holding the bearing arrangement relative to the fixed body component;
    a remote selector linkage which connects the manual selector lever kinematically to the selector shaft in such a way that the pivoting movements about the first pivoting axis inevitably lead to movements of the selector shaft in accordance with one of its degrees of freedom for the actuation of gear clutches;
    a flexible actuating linkage for transmitting pulling and pushing forces, which connects the manual selector lever kinematically to the manual selector lever in such a way that the pivoting movements about the second pivoting axis inevitably lead to movements of the manual selector lever in accordance with another of its degrees of freedom for the selection of a gear clutch;
    wherein the holding device includes a coupling linkage which, at its first end at the front in the longitudinal direction of the vehicle, is coupled to the gearbox casing and, at its second end, the end at the rear in the longitudinal direction of the vehicle, is coupled to the fixed body component in a manner which allows limited movement in the longitudinal direction of the vehicle, in that the bearing arrangement is provided at the second end of the coupling linkage; and
    wherein the second end of the linkage is supported by at least one pendulum support in such a way as to be pivotable relative to the body component about a pivoting axis transverse to the longitudinal direction of the vehicle.

8. Selector device according to Patent claim 2, including articulation points of the pendulum support which lie in an at least approximately upright transverse plane of the body component in a rest position.

9. Selector device for a change-speed gearbox comprising:
    a fixed body component of a vehicle body connected with a gearbox casing of the change-speed gearbox, the change-speed gearbox including:
        a selector shaft with a first degree of freedom relative to the gearbox casing for the actuation of gear clutches a second degree of freedom relative to the gearbox casing for the selection of a gear clutch for its actuation by the selector shaft, and
        an elastic support relative to the body component;
    a manual selector lever having a bearing arrangement for pivotability about two mutually perpendicular pivoting axes, the bearing arrangement having a holding device for holding the bearing arrangement relative to the fixed body component;

a remote selector linkage which connects the manual selector lever kinematically to the selector shaft in such a way that the pivoting movements about the first pivoting axis inevitably lead to movements of the selector shaft in accordance with one of its degrees of freedom for the actuation of gear clutches;

a flexible actuating linkage for transmitting pulling and pushing forces, which connects the manual selector lever kinematically to the manual selector lever in such a way that the pivoting movements about the second pivoting axis inevitably lead to movements of the manual selector lever in accordance with another of its degrees of freedom for the selection of a gear clutch;

wherein the holding device includes a coupling linkage which, at its first end at the front in the longitudinal direction of the vehicle, is coupled to the gearbox casing and, at its second end, the end at the rear in the longitudinal direction of the vehicle, is coupled to the fixed body component in a manner which allows limited movement in the longitudinal direction of the vehicle, in that the bearing arrangement is provided at the second end of the coupling linkage; and wherein the second end of the linkage is connected pivotally to a slide which is guided in a slide guide of the body component in such a way as to be displaceable in the longitudinal direction of the vehicle.

10. Selector device according to Patent claim 9, wherein the slide guide lies in a guide plane of the body component, the said guide plane sloping forwards in the longitudinal direction of the vehicle.

11. Selector device according to Patent claim 9, wherein the slide is connected to the second end of the coupling linkage by a spherical joint.

12. Selector device for a change-speed gearbox comprising:

a fixed body component of a vehicle body connected with a gearbox casing of the change-speed gearbox, the change-speed gearbox including:

a selector shaft with a first degree of freedom relative to the gearbox casing for the actuation of gear clutches a second degree of freedom relative to the gearbox casing for the selection of a gear clutch for its actuation by the selector shaft, and an elastic support relative to the body component;

a manual selector lever having a bearing arrangement for pivotability about two mutually perpendicular pivoting axes, the bearing arrangement having a holding device for holding the bearing arrangement relative to the fixed body component;

a remote selector linkage which connects the manual selector lever kinematically to the selector shaft in such a way that the pivoting movements about the first pivoting axis inevitably lead to movements of the selector shaft in accordance with one of its degrees of freedom for the actuation of gear clutches;

a flexible actuating linkage for transmitting pulling and pushing forces, which connects the manual selector lever kinematically to the manual selector lever in such a way that the pivoting movements about the second pivoting axis inevitably lead to movements of the manual selector lever in accordance with another of its degrees of freedom for the selection of a gear clutch;

wherein the holding device includes a coupling linkage which, at its first end at the front in the longitudinal direction of the vehicle, is coupled to the gearbox casing and, at its second end, the end at the rear in the longitudinal direction of the vehicle, is coupled to the fixed body component in a manner which allows limited movement in the longitudinal direction of the vehicle, in that the bearing arrangement is provided at the second end of the coupling linkage; and wherein the second end of the linkage is suspended relative to the body component by means of an oscillating link in such a way as to oscillate about a geometric axis transverse to the longitudinal direction of the vehicle.

13. Selector device according to Patent claim 12, wherein the oscillating link and a rigid extension of the second end of the linkage, the said extension being connected pivotably to the oscillating link, are in the form of a hinge.

14. Selector device for a change-speed gearbox comprising:

a fixed body component of a vehicle body connected with a gearbox casing of the change-speed gearbox, the change-speed gearbox including:

a selector shaft with a first degree of freedom relative to the gearbox casing for the actuation of gear clutches a second degree of freedom relative to the gearbox casing for the selection of a gear clutch for its actuation by the selector shaft, and an elastic support relative to the body component;

a manual selector lever having a bearing arrangement for pivotability about two mutually perpendicular pivoting axes, the bearing arrangement having a holding device for holding the bearing arrangement relative to the fixed body component;

a remote selector linkage which connects the manual selector lever kinematically to the selector shaft in such a way that the pivoting movements about the first pivoting axis inevitably lead to movements of the selector shaft in accordance with one of its degrees of freedom for the actuation of gear clutches;

a flexible actuating linkage for transmitting pulling and pushing forces, which connects the manual selector lever kinematically to the manual selector lever in such a way that the pivoting movements about the second pivoting axis inevitably lead to movements of the manual selector lever in accordance with another of its degrees of freedom for the selection of a gear clutch;

wherein the holding device includes a coupling linkage which, at its first end at the front in the longitudinal direction of the vehicle, is coupled to the gearbox casing and, at its second end, the end at the rear in the longitudinal direction of the vehicle, is coupled to the fixed body component in a manner which allows limited movement in the longitudinal direction of the vehicle, in that the bearing arrangement is provided at the second end of the coupling linkage; and wherein the actuating linkage is connected to one lever arm of a two-armed bell crank lever, which is mounted in such a way that it can pivot relative to the gearbox casing about a pivoting axis transverse to the longitudinal direction of the vehicle, and in that the other lever arm of the bell crank lever is connected to a fixed lever arm of the selector shaft by a link rod.

15. Selector device according to Patent claim 14, wherein the fixed lever arm of the selector shaft is directly connected to a ball socket of a ball-and-socket joint which connects the selector shaft to the remote selector rod.

16. A selector device for a change-speed gear box comprising:
- a gear box casing of the change-gear box including a selector shaft and a lever arm associated with the selector shaft so as to be movable therewith relative to the gearbox casing for actuating gear clutches;
- a manual selector level including a bearing arrangement for pivotally supporting the selector lever about a first pivoting axis and a second pivoting axis, and a holding device for supporting the bearing arrangement, the holding device being operatively associated with a body component of a vehicle body;
- a remote selector linkage connected between the manual selector lever and the selector shaft for moving the selector shaft and actuating a gear clutch when the manual selector level is pivoted about the first pivoting axis;
- a flexible actuating linkage being connected between the manual selector lever and the lever arm of the selector shaft for transmitting generated forces to move the lever arm of the selector shaft for actuating gear clutches; and
- a coupling linkage having a first end which is located toward one end of the vehicle along a longitudinal direction of the vehicle, the first end of the coupling linkage being operatively linked to the gearbox casing, the coupling linkage having a second end which is located towards another end of the vehicle and being operatively linked to the body component to allow limited movement in the longitudinal direction of the vehicle, and the bearing arrangement of the holding device being located at the second end of the coupling linkage, wherein the second end of the coupling linkage can travel along a guided path in the longitudinal direction of the vehicle relative to the body component.

17. The selector device of claim 16, wherein a lever arm is associated with the manual selector lever and a ball-and-socket joint operatively connects the flexible actuating linkage to the lever arm.

18. The selector device of claim 17, wherein the bearing arrangement of the manual selector lever is a ball-and-socket joint having a pivoting center, the lever arm is fixed and a center line of the fixed lever arm extends through the pivoting center of the ball-and-socket joint.

19. The selector device of claim 16, wherein the remote selector selector linkage includes a remote selector rod which operatively connects the selector shaft to the manual selector lever.

20. The selector device of claim 19, wherein a ball-and-socket joint operatively connects the remote selector rod to the selector shaft.

21. The selector device of claim 19, wherein a uniaxial joint operatively connects the remote selector rod to the manual selector lever, the uniaxial joint including an axis which extends transversely to the longitudinal direction of the vehicle.

22. The selector device of claim 16, further including a two-armed bell crank lever having a first lever arm and a second lever arm, the first lever arm being operatively connected to the flexible actuating linkage and the second lever arm being operatively connected to the lever arm of the selector shaft by a link rod, the two-armed bell cranked level being pivotally mounted to the gearbox housing such that it can pivot about a pivoting axis arranged transversely to the longitudinal direction of the vehicle.

23. A selector device for a change-speed gear box comprising:
- a gear box casing of the change-gear box including a selector shaft and a lever arm associated with the selector shaft so as to be movable therewith relative to the gearbox casing for actuating gear clutches;
- a manual selector level including a bearing arrangement for pivotally supporting the selector lever about a first pivoting axis and a second pivoting axis, and a holding device for supporting the bearing arrangement, the holding device being operatively associated with a body component of a vehicle body;
- a remote selector linkage connected between the manual selector lever and the selector shaft for moving the selector shaft and actuating a gear clutch when the manual selector level is pivoted about the first pivoting axis;
- a flexible actuating linkage being connected between the manual selector lever and the lever arm of the selector shaft for transmitting generated forces to move the lever arm of the selector shaft for actuating gear clutches; and
- a coupling linkage having a first end which is located toward one end of the vehicle along a longitudinal direction of the vehicle, the first end of the coupling linkage being operatively linked to the gearbox casing, the coupling linkage having a second end which is located towards another end of the vehicle and being operatively linked to the body component to allow limited movement in the longitudinal direction of the vehicle, and the bearing arrangement of the holding device being located at the second end of the coupling linkage, wherein at least one pendulum support is arranged to pivotally support the second end of the coupling linkage about a pivoting axis extending transversely to the longitudinal direction of the vehicle.

24. The selector device of claim 23, wherein the at least one pendulum support is configured to pivot at two articulation points which lie in a plane which is substantially perpendicular to a plane defined by the body component in a rest position.

25. A selector device for a change-speed gear box comprising:
- a gear box casing of the change-gear box including a selector shaft and a lever arm associated with the selector shaft so as to be movable therewith relative to the gearbox casing for actuating gear clutches;
- a manual selector level including a bearing arrangement for pivotally supporting the selector lever about a first pivoting axis and a second pivoting axis, and a holding device for supporting the bearing arrangement, the holding device being operatively associated with a body component of a vehicle body;
- a remote selector linkage connected between the manual selector lever and the selector shaft for moving the selector shaft and actuating a gear clutch when the manual selector level is pivoted about the first pivoting axis;
- a flexible actuating linkage being connected between the manual selector lever and the lever arm of the selector shaft for transmitting generated forces to move the lever arm of the selector shaft for actuating gear clutches; and
- a coupling linkage having a first end which is located toward one end of the vehicle along a longitudinal direction of the vehicle, the first end of the coupling linkage being operatively linked to the gearbox casing, the coupling linkage having a second end which is located towards another end of the vehicle and being operatively linked to the body component to allow limited movement in the longitudinal direction of the vehicle, and the bearing arrangement of the holding device being located at the second end of the coupling linkage, wherein a slide is pivotally connected to the second end of the coupling linkage, the slide being guided in a slide guide which is associated with the body component such that the slide guide is displacable in the longitudinal direction of the vehicle.

26. The selector device of claim 25, wherein the slide guide lies in a guide plane, said guide plane arranged to slope forward toward the one end of the vehicle in the longitudinal direction.

27. The selector device of claim 25, wherein a spherical joint connects the slide to the second end of the coupling linkage.

28. A selector device for a change-speed gear box comprising:

a gear box casing of the change-gear box including a selector shaft and a lever arm associated with the selector shaft so as to be movable therewith relative to the gearbox casing for actuating gear clutches;

a manual selector level including a bearing arrangement for pivotally supporting the selector lever about a first pivoting axis and a second pivoting axis, and a holding device for supporting the bearing arrangement, the holding device being operatively associated with a body component of a vehicle body;

a remote selector linkage connected between the manual selector lever and the selector shaft for moving the selector shaft and actuating a gear clutch when the manual selector level is pivoted about the first pivoting axis;

a flexible actuating linkage being connected between the manual selector lever and the lever arm of the selector shaft for transmitting generated forces to move the lever arm of the selector shaft for actuating gear clutches; and a coupling linkage having a first end which is located toward one end of the vehicle along a longitudinal direction of the vehicle, the first end of the coupling linkage being operatively linked to the gearbox casing, the coupling linkage having a second end which is located towards another end of the vehicle and being operatively linked to the body component to allow limited movement in the longitudinal direction of the vehicle, and the bearing arrangement of the holding device being located at the second end of the coupling linkage, wherein an oscillating link operatively connects the second end of the coupling linkage to the body component to allow the second end of the coupling linkage to oscillate about an axis transverse to the longitudinal direction of the vehicle.

29. The selector device of claim 28, wherein a rigid extension of the second end of the coupling linkage and the oscillating link are pivotally connected and form a hinge.

30. A selector device for a change-speed gear box comprising:

a gear box casing of the change-gear box including a selector shaft and a lever arm associated with the selector shaft so as to be movable therewith relative to the gearbox casing for actuating gear clutches;

a manual selector level including a bearing arrangement for pivotally supporting the selector lever about a first pivoting axis and a second pivoting axis, and a holding device for supporting the bearing arrangement, the holding device being operatively associated with a body component of a vehicle body;

a remote selector linkage connected between the manual selector lever and the selector shaft for moving the selector shaft and actuating a gear clutch when the manual selector level is pivoted about the first pivoting axis;

a flexible actuating linkage being connected between the manual selector lever and the lever arm of the selector shaft for transmitting generated forces to move the lever arm of the selector shaft for actuating gear clutches; and a coupling linkage having a first end which is located toward one end of the vehicle along a longitudinal direction of the vehicle, the first end of the coupling linkage being operatively linked to the gearbox casing, the coupling linkage having a second end which is located towards another end of the vehicle and being operatively linked to the body component to allow limited movement in the longitudinal direction of the vehicle, and the bearing arrangement of the holding device being located at the second end of the coupling linkage; and a two-armed bell crank lever having a first lever arm and a second lever arm, the first lever arm being operatively connected to the flexible actuating linkage and the second lever arm being operatively connected to the lever arm of the selector shaft by a link rod, the two-armed bell cranked level being pivotally mounted to the gearbox housing such that it can pivot about a pivoting axis arranged transversely to the longitudinal direction of the vehicle, wherein a ball-and-socket joint operatively connects the remote connector linkage to the selector shaft and the lever arm associated with the selector shaft is directly connected to a ball socket of the ball-and-socket joint.

* * * * *